July 29, 1947.   E. B. THOMPSON   2,424,673
VEHICLE HOIST
Filed Feb. 15, 1945
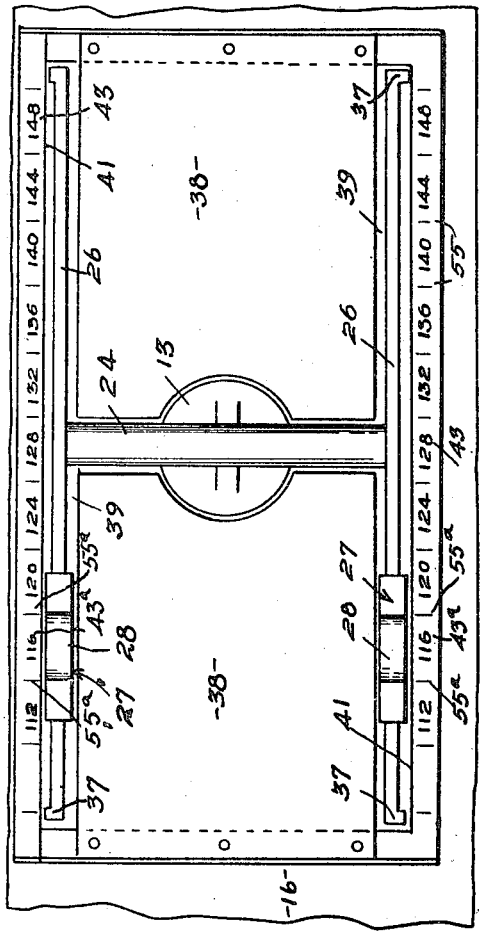
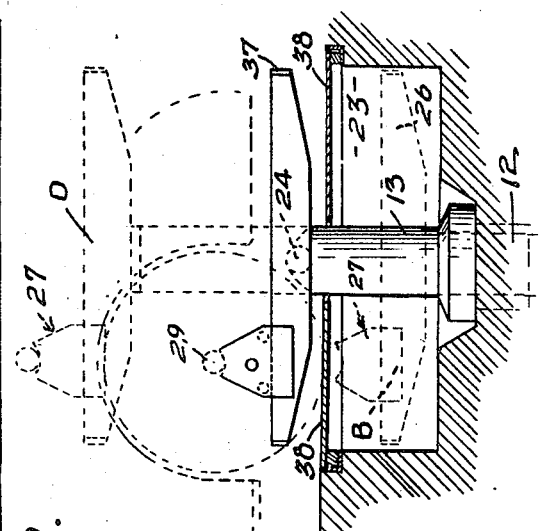
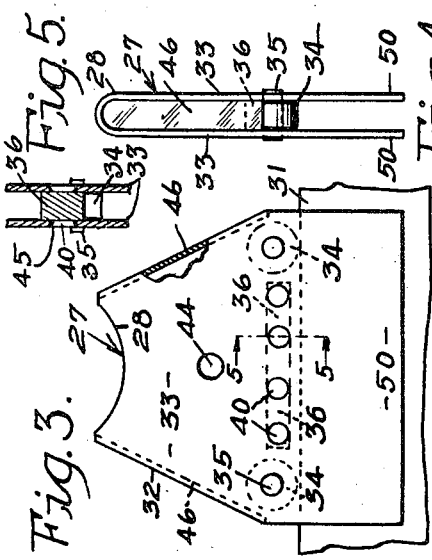
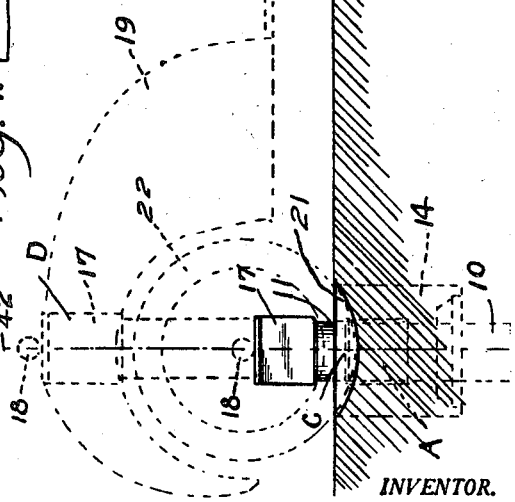
INVENTOR.
ELMER B. THOMPSON
by Rudolph L. Lowell
att'y Patented July 29, 1947

2,424,673

UNITED STATES PATENT OFFICE 2,424,673

VEHICLE HOIST

Elmer B. Thompson, Des Moines, Iowa, assignor to Globe Hoist Company, Des Moines, Iowa, a corporation of Iowa Application February 15, 1945, Serial No. 578,029

2 Claims. (Cl. 254—89)

This invention relates generally to automobile hoists and in particular to an automobile hoist having adjustable axle engaging blocks and means for indicating an adjusted position of the blocks in an axle engaging position prior to the operation of the hoist to lift an automobile. This application is a continuation in part of application Serial Number 565,699, filed November 29, 1944.

Automobile hoists now in general use include blocks or like means which are movable to adjusted positions to engage the axles of automobiles having varying wheel bases or distances between their front and rear axles. In the operation of these hoists the adjusted position of the movable blocks is generally determined by a cut and try method. In other words the blocks are moved by the hoist operator to a position which in his judgment should engage the automobile axles. The hoist is then slowly raised until the blocks approach an axle engaging position. The hoist is then stopped and the operator adjusts the blocks to a position under the automobile axles and the hoist is again raised, until the automobile is in a supported position on the blocks. Again the hoist is stopped and a final check made by the operator as to a proper engagement of the blocks with the axles prior to raising the automobile to a final lifted position. This procedure is not only relatively expensive because of the time lost in adjusting the hoist for a safe and proper elevation of the automobile, but it is also inconvenient and tiresome to the hoist operator since it usually necessitates appreciable bending over and sometimes crawling under the automobile to ascertain a correct position of the blocks.

It is an object of this invention, therefore, to provide a vehicle hoist in which axle engaging members are adjustable to axle engaging positions prior to driving the vehicle on the hoist.

Yet another object of this invention is to provide a vehicle hoist in which the relative position of the front and rear axle engaging members of the hoist is indicated in terms of the wheel base of a vehicle to be elevated, prior to the driving of a vehicle on the hoist.

Another object of this invention is to provide a two post vehicle hoist which can be operated to support a vehicle in a longitudinally inclined position after the vehicle is in a raised position.

A feature of this invention is found in the provision of a two post vehicle hoist in which a first hoist is adapted to engage one axle of a vehicle to be lifted at a fixed or known position on such hoist, and with the other hoist having adjustable members for engaging the second axle of the vehicle. The adjustable members are operatively associated with an indicating means which defines, in terms of the wheel base of the vehicle, the distance of the adjustable axle engaging members from the fixed position on the first hoist, whereby the hoist is capable of being set for properly raising a vehicle prior to the operation of the hoist, or to the driving of the vehicle upon the hoist.

Further objects, features and advantages of this invention will become apparent from the following description when taken in connection with the accompanying drawings in which:

Fig. 1 is a side elevational view of a two post hoist in a partly elevated position and embodying the indicating means of this invention;

Fig. 2 is a plan view of the rear hoist showing the means for indicating an adjusted position of rear axle engaging blocks movable longitudinally on the rear hoist;

Fig. 3 is an enlarged side elevational view of a rear axle engaging block shown in assembly relation with the rear hoist;

Fig. 4 is an end elevational view of the rear axle engaging block; and

Fig. 5 is a sectional view taken on the line 5—5 in Fig. 3.

With reference to the drawings there is shown in Fig. 1 an automobile hoist of two post type adapted to be lowered below the surface of a floor and covered to provide for a substantially normal use of the floor, when the hoist is not being used. The hoist includes a front hoist having a cylinder 10 operatively associated with a piston or lifting member 11, and a rear hoist including a cylinder 12 and associated piston 13. The front hoist is located in a pit 14 formed in a floor surface, indicated generally as 16, and includes a front axle supporting structure or saddle 17 for engaging the front axle 18 of an automobile indicated generally at 19. The opening at the top of the pit 14 is of a size and shape such that the saddle member 17, at the lowermost limit of travel of the piston 11, as shown in dotted lines at A in Fig. 1, is received within the pit below the surface of the floor 16.

The location of the axle 18 at a centered position relative to the saddle 17 is accomplished by the provision of a pair of front wheel-receiving depressions 21 formed in the floor surface 16 at opposite sides of the front hoist. Thus on driving the front wheels 22 of the automobile within the depressions 21 the axle 18 is centered relative to the saddle 17 so as to be engaged thereby on elevation of the piston 11. This manner of centering the front axle of an automobile relative to the front hoist of a two post hoist is well known so that a further description thereof is believed to be unnecessary.

The rear hoist is mounted in a floor pit 23 and includes a rear axle supporting structure having a transversely extended frame member 24 (Fig. 2) supported at its central portion on the top of the piston 13. The opposite ends of the frame member 24 in turn support flat upright longitudinally extended plate members 26. Each end of the frame member 24 is fixed to a corresponding member 26 by welding so as to be within the confines of the outer side of a member 26.

A rear axle engaging block, indicated generally as 27, is movably carried on the top edge of each upright member 26 for movement longitudinally thereof to a position for engaging the rear axle 29 of the automobile 19. Each block 27 (Figs. 3, 4 and 5) is integrally formed from a single piece of material and is of a substantially U-shape in cross section. The top surface 28 of the block 27 is of a concave arcuate shape adapted to cradle or receive the automobile rear axle 29 with the ends of the block having portions 32 sloped downwardly and outwardly from the top surface 28 to a point substantially midway in the height of the block as clearly shown in Fig. 3. A pair of spaced rollers 34 are rotatably supported on pins 35 connected between the legs or sides 33 of the block 27, with the axes of the pins 35 being located in a common plane extended substantially through the lower ends of the inclined end portions 32. Secured between the sides 33 and intermediate the rollers 34 is a spacer bar 36. To support the bar 36 within the lateral confines of the block 27 the sides 33 are formed with oppositely arranged openings 40. The bar 36 is then positioned between the openings 40 and secured to the sides 33 about the openings 40 by a welding, indicated at 45 in Fig. 5.

The lower sections 50 of the block sides 33, located below the level of the rollers 34, constitute guide members for guidably supporting the block 27 on the upper edge of a corresponding frame member 26, with the rollers 34 being ridable on the top surface of a member 26, which surface constitutes a track for the rollers. Each end of a frame member 26 is integrally formed with a stop 37 to limit the travel of a corresponding block 27 between such ends.

The opening of the rear pit 23 is of a size and shape such that when the piston 13 is at its lowermost limit of travel, indicated in dotted lines at B in Fig. 1, the rear axle supporting structure is receivable within the pit at a position below the level of the floor 16. Closing of the pit opening 23, when the rear hoist is in either a raised or lowered position, is accomplished by the provision of means including a pair of floor cover plates 38 arranged at opposite sides of the piston 13 and between the frame members 26. Each frame member 26 and corresponding block 27, in a lowered position of the piston 13, are received within an opening 39 formed between the cover plates 38 and a side 41 of the pit 23. By virtue of a member 26 being of a flat form and arranged in an upright position, and a corresponding block 27 being in a straddled position on the top surface of the member 26, the openings 39 are of a relatively narrow width whereby they can be left uncovered at all times without creating any potential physical hazard to the hoist operator. The means for covering the pit 23, when the rear hoist is in either a raised or lowered position, is described in detail in application Ser. No. 565,699, filed November 29, 1944.

In the operation of the hoist the front and rear hoists are initially in their lowered dotted line positions A and B within the pits 14 and 23, respectively, as shown in Fig. 1. The blocks 27 are moved to an adjusted position corresponding to the wheel base of the automobile to be lifted by the provision of means including the wheel depressions 21. As previously explained the wheel depressions 21 are adapted to receive the front wheels 22 of the automobile 19 to center the front axle 18 relative to the saddle 17 of the front hoist. At this centered position of the axle 18 its axis is in a vertical plane, indicated at 42 in Fig. 1, extended substantially through the longitudinal center C of the wheel depressions 21. With the centered position of the axle 18 thus located relative to the longitudinal center C of the wheel depressions 21 the location of a rear axle 29 of an automobile can be determined by merely measuring the automobile wheel base on the floor 16 in a direction rearwardly from the longitudinal center C.

Thus as shown in Fig. 2 wheel base markings 43 are arranged along the sides 41 of the rear pit 23 corresponding to measured distances from the longitudinal center C. Since the frame members 26 are about four feet in length the blocks 27 are capable of being adjusted to positions for engaging the rear axles of all commercial types of passenger automobiles. The blocks 27 are thus movable in a forward direction, or to the left as shown in Fig. 1, to engage the rear axle of an automobile having a wheel base of less than 112 inches, and movable rearwardly, or to the right, as also viewed in Fig. 2, to a position to engage the rear axle of an automobile having a wheel base greater than 144 inches.

Since the wheel bases of all automobiles are generally known to the hoist operator, the blocks 27 are movable to centered positions for engaging the rear axle of the automobile, while the rear hoist is in its lowered position B within the pit 23. The markings 43 are located between adjacent graduations 55 spaced four inches apart. It is contemplated that the top surface 28 of the block 27 also be four inches long. By moving a block 27 so that the ends of its top surface 28 are in alignment with adjacent graduations 55 and opposite a marking 43, the block 27 is properly positioned for engaging the rear axle of an automobile having a wheel base corresponding to the marking 43 between such adjacent graduations.

Thus for example assume that an automobile having a wheel base of 116 inches is to be raised. Each block 27 is moved on the top surface of a corresponding member 26 to a position such that the top surface 28 of a block is between the graduations indicated as 55a and having therebetween the 116 inch marking indicated as 43a (Fig. 2). With the blocks 27 thus positioned the automobile is driven over the hoist and its front wheels 22 located in the wheel depressions 21 to center its front axle 18 relative to the saddle 17. With the front axle 18 centered the rear axle 29 is located 116 inches rearwardly from the vertical plane 42 or longitudinal center C so that on operation of the hoist to raise the automobile the rear axle 29 is received within the concave top surfaces 28 of the blocks 27. As a result of this adjustment of the blocks 27 in a rear axle engaging position the automobile 19 is able to be lifted directly to any desired elevation, as indicated by dotted lines D in Fig. 1, so as to eliminate all trial and error operations heretofore required by the hoist operator to properly center the automobile on the hoist.

It is readily apparent that since the blocks 27 are rollable on the top surfaces of a member 26 that any slight misalignment of the blocks 27 relative to the rear axle 29 is readily accommodated as the axle 29 is received within the concave top surfaces 28 of the blocks.

As previously explained the members 26 and blocks 27, in a lowered position of the rear hoist, are received within the openings 39 below the level of the floor surface 16. The ends of the top surface 28 of a block 27 are thus substantially at the level of the floor surface 16 so that their movement to positions in alignment with adjacent graduations 55 is easily observed. Since the blocks 27 are supported for adjustable movement on the rollers 34 they are readily moved by merely pushing them forwardly or rearwardly on the members 26 by a usual block hook. Adjustment of the blocks for a partly raised position of the hoist may be accomplished by inserting the block hook in a hook opening 44 formed in each block side wall 33.

By virtue of the blocks 27 being receivable within the openings 39, dirt and the like is free to fall on the blocks. To prevent this dirt from collecting about the rollers 34 and impeding their free rotation, the inclined end portions 32 of a block 27 are covered by shields or guards 46 welded between the side walls 33. The rollers 34 are thus substantially covered and protected from any dirt falling upon the blocks when they are in the openings 39, or dropping thereon from an automobile when the hoist is in an elevated position.

In some types of servicing on an automobile it is desirable to have one end of the automobile at a different elevation than the other end of the automobile. This is accomplished by a relative operation of the front and rear hoists so that one is at a different elevation than the other. With an automobile supported in an inclined position the distance between its front and rear axles in a horizontal plane will vary according to the degree of inclination. However, since the blocks 27 are rollable on the supporting members 26 the blocks 27 are movable longitudinally of the members 26 by the elevated automobile in response to the operation of the front and rear hoists to different elevations so as to retain the automobile in a supported and centered position at all times.

As previously mentioned a spacer bar 36 is secured between the sides 33 of a block 27 and the rollers 34 of such block. It is contemplated that the bottom side of the bar 36 be spaced only a relatively small distance above the top surface of a corresponding frame member 26. Thus in the event of a failure or the shearing off of a roller shaft 35, the block 27 will drop to a supported position on the bar 36 to prevent the automobile from falling out of a centered position on the hoist and avoid any possible injury to a service man who might be working under the automobile.

From a consideration of the above description it is seen that the invention provides an automobile hoist having means for adjusting the axle-engaging portions thereof to centered positions for the automobile to be lifted prior to the driving of the automobile on the hoist. Although the markings 43 and graduations 55 are illustrated as being arranged on the sides 41 of the rear pit 23 it is to be understood that such markings and graduations may also be carried directly on the frame members 26 and that the centering of a block 27 relative to such markings can be accomplished by means other than the use of the ends of the block top surface 28. It is to be understood also that although the invention has been described with respect to a preferred embodiment thereof that it is not to be so limited since changes and modifications can be made therein which are within the full intended scope of this invention as defined by the appended claims.

I claim:

1. In a vehicle lift including front and rear lift members for engaging the front and rear axles of a vehicle to lower and raise said vehicle, with one of said lift members having a pair of longitudinally extended transversely spaced flat upright frame members carried at the upper end thereof, longitudinally movable axle-engaging blocks for said frame members, oppositely arranged guide members on said blocks adapted to straddle said frame members, rollers rotatably supported between said guide members and ridable on the top edges of corresponding ones of said frame members, whereby said blocks, on operation of said lift members to different elevations, are movable by a vehicle carried on said lift members to provide for the centered support of the vehicle in a longitudinally inclined position.

2. In a vehicle lift including a lift member, an axle supporting structure carried on the upper end of said lift member including a pair of flat longitudinally extended upright plate members, axle engaging members movable longitudinally of said upright members to axle engaging positions, with each of said axle engaging members including a pair of transversely spaced guide members arranged in a straddling relation with an upright member, a pair of rollers rotatably supported between said guide members and ridable on the top surface of said upright members, and spacer members arranged between said guide members and intermediate said rollers, with the bottom side of said spacer members being closely adjacent to the top surfaces of said upright members.

ELMER B. THOMPSON.

REFERENCES CITED

The following references are of record in the file of this patent:

UNITED STATES PATENTS

| Number | Name | Date |
| --- | --- | --- |
| 1,684,729 | Denio | Sept. 18, 1928 |
| 2,015,357 | Weaver | Sept. 24, 1935 |
| 2,100,617 | Thompson | Nov. 30, 1937 |
| 1,948,367 | Bristol | Feb. 20, 1934 |